United States Patent
Meyer et al.

(10) Patent No.: US 8,520,246 B2
(45) Date of Patent: Aug. 27, 2013

(54) METHOD FOR AUTOMATICALLY DETERMINING REMOTE PRINTER CHARACTERISTICS

(75) Inventors: Lawrence W. Meyer, Fairport, NY (US); Juan T. Golphin, Rochester, NY (US); Walter J. Igharas, Webster, NY (US); Michael C. Burkard, Canandaigua, NY (US)

(73) Assignee: Xerox Corporation, Norwalk, CT (US)

( * ) Notice: Subject to any disclaimer, the term of this patent is extended or adjusted under 35 U.S.C. 154(b) by 126 days.

(21) Appl. No.: 13/211,415

(22) Filed: Aug. 17, 2011

(65) Prior Publication Data

US 2013/0044349 A1 Feb. 21, 2013

(51) Int. Cl.
*G06F 15/00* (2006.01)

(52) U.S. Cl.
USPC .................................... 358/1.15; 358/1.19

(58) Field of Classification Search
None
See application file for complete search history.

(56) References Cited

U.S. PATENT DOCUMENTS 7,856,488 B2 12/2010 Cripe et al.
2003/0193688 A1* 10/2003 Namikata .................... 358/1.15

OTHER PUBLICATIONS

The file history of U.S. Appl. No. 13/077,001, filed Mar. 31, 2011 for "Method and System for Updating Device Management Application Meter Read Logic"; Inventors: Tsongas et al.

\* cited by examiner

*Primary Examiner* — Twyler Haskins
*Assistant Examiner* — Helen Q Zong
(74) *Attorney, Agent, or Firm* — Michael J. Nickerson; Basch & Nickerson LLP (57) ABSTRACT

A system and method automatically detect parameters of a printer on a network having an unknown profile, to create a useable profile for the printer having the unknown profile by querying, via a predetermined protocol between a network administrator processor and the printer on the network having the unknown profile, a first state of the printer on the network having the unknown profile. The network administrator processor identifies parameters associated with the state of the printer on the network having the unknown profile by comparing the first state of the printer on the network having the unknown profile to the second state of the printer on the network having the unknown profile and the third state of the printer on the network having the unknown profile and creates a useable profile for the printer on the network having the unknown profile based upon the identified parameters.

16 Claims, 8 Drawing Sheets

FIG. 1

202 — Frame 102: 76 bytes on wire (608 bits), 76 bytes captured (608 bits)
204 — Ethernet II, Src: PCI_b4:5f:df (00:1a:a0:b4:5f:df), Dst: Printer1_f2:37:40 (00:1b:78:f2:37:40)
206 — Internet Protocol, Src: NNN.NNN.NNN.155 (NN.NNN.NNN.155), Dst: NN.NNN.NNN.13 (NN.NNN.NNN.13)
208 — User Datagram Protocol, Src Port: 61721 (61721), Dst Port: snmp (161)
210 — Simple Network Management Protocol 212 — version: version-1 (0)
community: public
data: get-next-request (1)

214 — get-next-request
request-id: 1
error-status: noError (0)
error-index: 0
variable-bindings: 1 item 216 — 1.3.6: Value (Null)
objectName: 1.3.6 (iso.3.6)
Value (Null)

FIG. 2

302 — Frame 107: 173 bytes on wire (1384 bits), 173 bytes captured (1384 bits)
⊞ Ethernet II, Src: Printeri_f2:37:40 (00:1b:78:f2:37:40), Dst: PCI_b4:5f:df (00:1a:a0:b4:5f:df)
⊞ Internet Protocol, Src: NN.NNN.NNN.13 (NN.NNN.NNN.13), Dst: NN.NNN.NNN.155 (NN.NNN.NNN.155)
⊞ User Datagram Protocol, Src Port: snmp (161), Dst Port: 61721 (61721)
⊟ Simple Network Management Protocol
  version: version-1 (0)
  community: public
304 — ⊟ data: get-response (2)
  ⊟ get-response
    request-id: 1
    error-status: noError (0)
    error-index: 0
    ⊟ variable-bindings: 1 item
306 — ⊟ 1.3.6.1.2.1.1.1.0: 4850204554484552e454204d554454492d454e56495246...
        object Name: 1.3.6.1.2.1.1.1.0 (iso.3.6.1.2.1.1.1.0)
        value (OctetString): 4850204554484552e454204d554454492d454e56495246...

```
⊞ Frame 37: 169 bytes on wire (1352 bits), 169 bytes captured (1352 bits)
⊞ Ethernet II, Src: PCI b4:5f:df (00:1a:a0:b4:5f:df), Dst: Printer1 f2:37:40 (00:1b:78:f2:37:40)
⊞ Internet Protocol, Src: NN.NNN.NNN.155 (NN.NNN.NNN.155), Dst: NN.NNN.NNN.13 (NN.NNN.NNN.13)
⊞ Transmission Control Protocol, Src Port: 17482 (17482), Dst Port: http (80), Seq: 155, Ack: 26, Len: 115
⊞ [Reassembled TCP Segments (269 bytes): #32(154), #37(115)]
⊟ Hypertext Transfer Protocol
    ⊞ POST /ipp HTTP/1.1\r\n
      Content-Type: application/ipp\r\n
      User-Agent: Internet Print Provider\r\n
      Host: NN.NNN.NNN.13\r\n
    ⊞ Content-Length: 115\r\n
      Expect: 100-continue\r\n
      \r\n
⊟ Internet Printing Protocol
      Version: 1.0
      Operation-id: Get-Printer-Attributes
      Request ID: 16909060
    ⊞ Operation attributes
      end of attributes
```

METHOD FOR AUTOMATICALLY DETERMINING REMOTE PRINTER CHARACTERISTICS

BACKGROUND

In systems where many computers and associated devices are connected on a network, keeping track of these devices may be a time consuming and difficult task.

There are a variety of conventional solutions to help people manage the resources on a network in an efficient manner. For example, managing printers comprises such activities as monitoring the state of a printer, identifying the need for maintenance actions for a printer, or accounting for printer usage. Other management functions are well known.

Printers are often difficult to manage because a large number of printers may be from different manufacturers and have widely different characteristics. If a new printer is added to the network, the management process needs to know about the printer's characteristics in order to manage the new printer along with any other printers on the network.

Conventionally, printers, which are designed to be connected to a network, contain a set of parameters that describe the capabilities and state of the printer.

One conventional example is the management information base defined by Internet RFC3805. These parameters may be read remotely, and in some cases, may also be changed remotely in order to change printer performance or capability.

If a printer follows the RFC3805 protocol, the printer's management information base may be interrogated by a remote computer. This allows the remote computer to see the state of the printer via the parameters of the management information base and to understand the capabilities of the printer that are defined in the management information base.

However, while RFC3805 defines a set of parameters for the management information base, reading the management information base reveals the values of the parameters but does not identify each parameter.

Other ways of storing information about a printer or the printer's state are also known to those skilled in the art. These may include, for example, private or proprietary areas of the SNMP base.

Furthermore, conventional networked printers may contain a web page or set of pages where the web pages may include information about the state of the printer and may include ways to alter one or more parameters of the printer via fields on a web page.

While there is no standard format for embedded web pages, nevertheless the HTML code that generates the web page may be parsed to identify portions of the web page that relate to printer properties or the printer's state.

If each printer on the network is to be managed, it is useful to build a profile for each printer on the network. Such a profile would contain information about the capabilities of the printer as well as a means to determine the state of the printer. The state of the printer may include such things as the levels of toner, the number of pages printed, whether the printer is idle or busy, etc.

It would be desirable to be able to build a profile for a new printer automatically in order to minimize the amount of time that a person would need to build the profile manually. It would be further desirable to be able to detect the existence of a new printer on a network and to be able to perform the automatic profile generation without manual intervention.

BRIEF DESCRIPTION OF THE DRAWING

The drawings are only for purposes of illustrating various embodiments and are not to be construed as limiting, wherein.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 1:
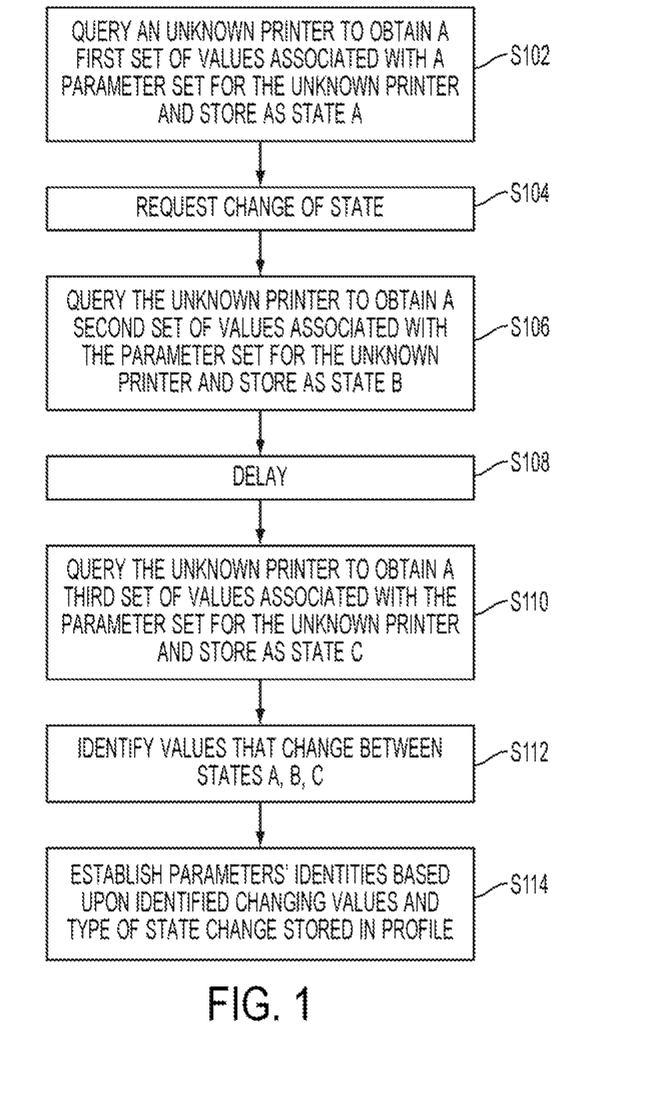
FIG. 1 illustrates a flowchart showing a method for automatically determining the identities of a set of initially unknown parameters of a printer.

FIG. 1 illustrates, in flowchart form, a method for automatically determining the identities of a set of initially unknown parameters of a printer.

In the various embodiments described below, the printer contains a management information base pursuant to RFC3805 specifications and the queries are via simple network management protocol. It is noted that the concepts, described below, are applicable to other printer management systems and communication protocols.

In the various descriptions below, the term parameter is used to define a characteristic or condition of the device (printer). For example, a printer parameter may be simplex, duplex, busy, out of paper, out of toner, jammed, etc.

For each parameter, the device has a value defining the state of the parameter. For example, the device may have a value of "1" for the "out of paper" parameter when the printer has no paper and a value of "0" for the "out of paper" parameter when the printer has paper.

In step S102, as illustrated in FIG. 1, a query is made by an administrative processor on the network to an unknown printer and a set of values for a set of parameters is retrieved by the query. The set of values for the set of parameters is stored by the administrative processor as state A. The identity of at least one parameter is assumed to be unknown and the process of FIG. 1 determines the identity of each unknown parameter.

For example, the Simple Network Management Protocol (SNMP) is used to walk through all of the addressable parameters in the printer's Management Information Base (MIB). The MIB is defined in Internet RFC 3805. The only information returned is an identifier and a data value.

In step S104, a change of state of the printer is requested by the administrative processor. During the process of establishing the identity of the parameters that characterize the printer, a variety of state changes may be used. For example, the change of state may be a request to print a page. Alternatively, the change of state may be a request to change the value of one of the parameters retrieved in step S102.

In step S106, a query is again made to the printer, as in step S102. The retrieved values of the parameters of the query of step S106 are stored by the administrative processor as state B.

In step S108, the administrative processor waits for some predetermined period. This period may depend on the kind of state change requested in step S104.

In step S110, a third query is made by the administrative processor and the retrieved values of the parameters of step S108 are stored as state C.

In step S112, a comparison is made between the value sets from states A, B, and C. The comparison will reveal which parameters have changed between the states.

For example, if a request to print a page constituted the state change request in step S104, and if one of the parameters identifies the count of pages printed, such a parameter will have incremented by one between state A and state B but will remain unchanged between state B and state C.

A variety of logical steps may be used to define the identity of the printer parameters using the differences between states A, B, and C For example, a value of parameter that changes between state A and state B, but also changes between state B and state C is most likely not related to the change state request of S104.

Similarly, the value change of a parameter between state A and state B should match the details of the S104 request.

For example, if the S104 request was to print "10" pages, only values of parameters that change by "10" between state A and state B are related to the state change request.

However, if the request was to print "10" pages duplex, values of parameters that change by "5" between state A and state B may also be related to the state change request. In such a case, if one of the parameter values changes by "10" and one of the parameter values changes by "5," the parameter value that changes by "10" may be related to a count of pages printed, while the parameter value that changes by "5" may be related to the number of sheets of paper used.

Once a parameter has been defined by the comparison of step S112, the definition is stored in a printer profile in step S114. The printer profile is intended to contain a complete definition of the parameters of the printer to allow a separate printer management process to manage the printer efficiently.

The process of FIG. 1 may be repeated over an extended period of time to allow further identification of parameters that change with time.

Another class of parameter change requests changes the state of a parameter that enables or disables a function of the printer. If such a parameter is identified, a second state change request may be made to undo the first state change request to identify the binary nature of the parameter.

Figure 2:
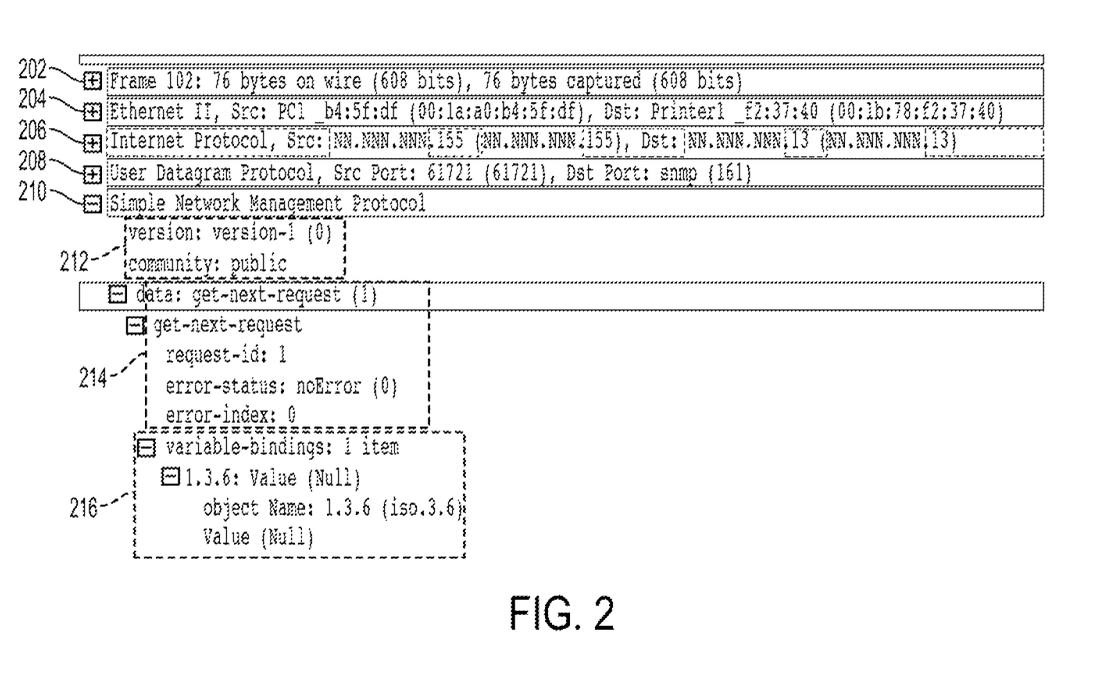
FIG. 2 illustrates shows an example of an electronic communication capture of an exchange between a control computer and a printer.

FIG. 2 shows an example of an electronic communication capture of an exchange between a control computer and a printer. A computer connected to a network may be used to capture all of the communication packets transmitted on the network, not just those addressed to the computer. The computer may decompose the various fields of the captured packets and displays the content of selected packets in a human readable form.

Line 202 indicates the number of bytes captured in the packet under examination. In this example, there were 76 bytes captured for a total of 608 bits.

Line 204 shows that the media access control address of the source and destination computers.

Line 206 shows that the packet was from version II of the Ethernet specification and that the source of the packet was a computer at IP address 13,121.238.155 and the destination was a computer at IP address 13.121.238.13.

Line 208 shows that the Internet Protocol used was user datagram protocol and indicates the source and destination port of the exchange.

Line 210 indicates that the particular packet used the simple network management protocol.

Each of the lines 202, 204, 206, 208 has a "+" sign next to it. Clicking on the plus sign will expand the selected line to display more detail of the information on that line. Line 210 has been expanded in this fashion to show the details of the packet.

For the packet in FIG. 2, line 212 indicates that version 1 of the simple network management protocol was used. Line 214 indicates that the packet was a simple network management protocol get-next-request. Line 216 expands the details of the get-next-request to show that the request is for the next item in the management information base after item 1.3.6.

Figure 3:
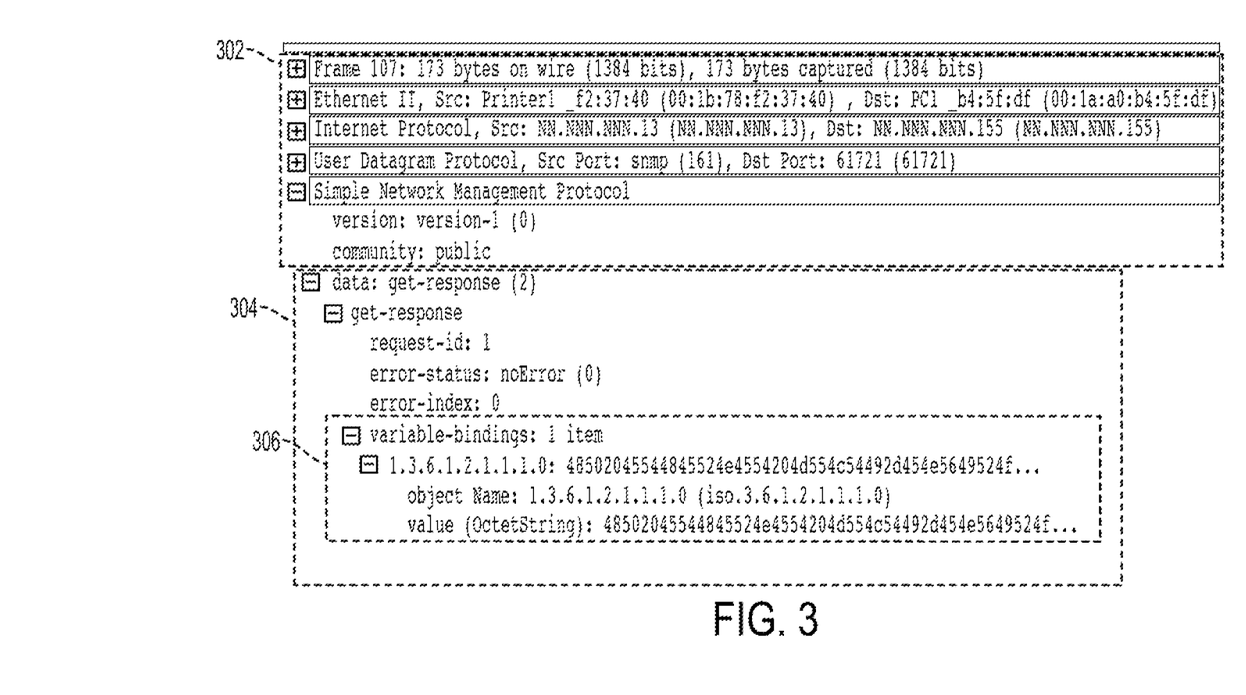
FIG. 3 shows a capture of the response of the printer to the simple network management protocol get-next-request packet of FIG. 2.

FIG. 3 shows a capture of the response of the printer to the simple network management protocol get-next-request packet of FIG. 2. Notice that the fields in elements 302 are identical to the same fields of FIG. 2, except that the source and destination addresses are interchanged.

Line 304 shows that the captured packet constituted a get-response to the earlier get-next-request. The line 304 has been expanded to show the details of the response.

In particular line 306 shows that the next item in the management information base has value 1.3.6.1.2.1.1.1.0. It has a name which is the same as the number and the value of the field is the octet string (base-16 digits) that begins with 48050204. These values may be associated with definitions of the field IDs contained in the RFC that defines the protocol.

For the illustrated example, this protocol is simple network management protocol version 1 and the corresponding RFC is RFC 1759.

Figure 4:
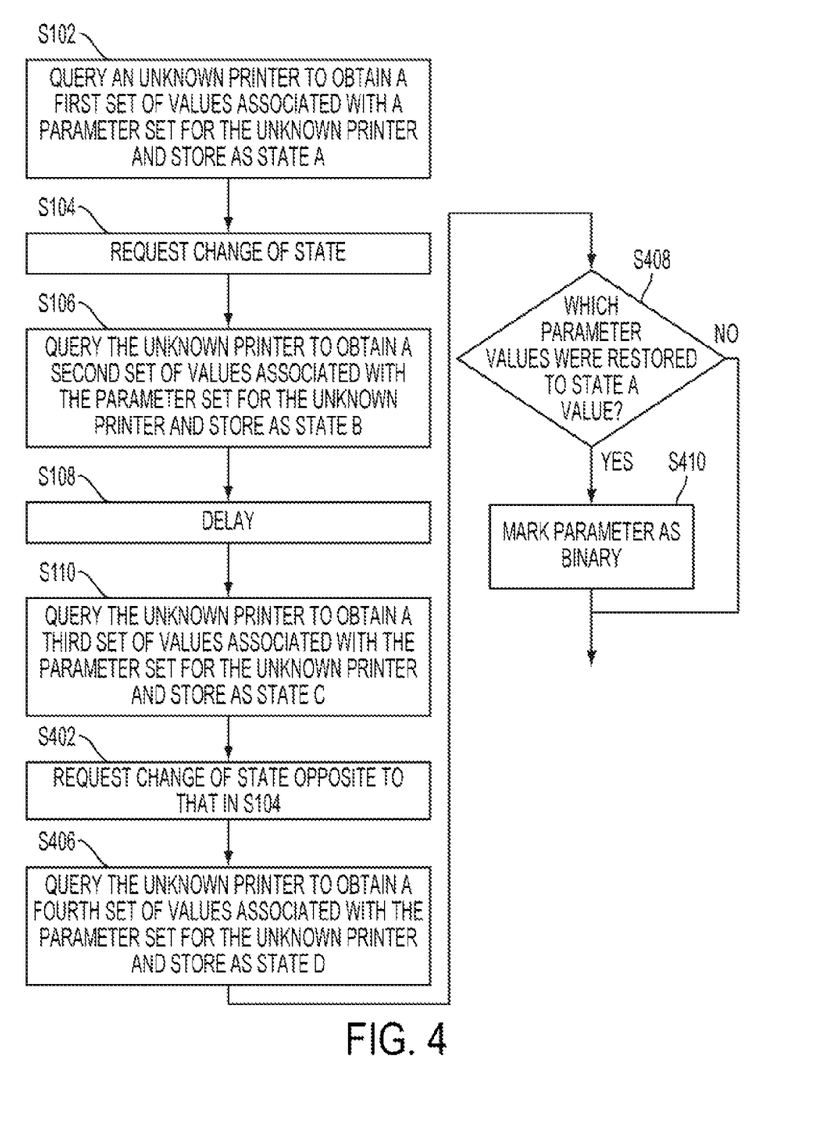
FIG. 4 shows an extension of the process of FIG. 1.

FIG. 4 shows an extension of the process of FIG. 1. After step S110, another state change request is made, in step S402. This state request is for a state change that is for the opposite state of the request made in step S104. For example, the request of S104 may have been to enable duplex printing and the request of step S402 may be to enable only single-sided (simplex) printing.

In step S406, another query is made to the remote printer and the parameter value set is stored as state D. A comparison between state B and state D may show that the parameter value that was changed in step S104 has reverted to its original state—that is state A.

If this is the case, the parameter in question has been identified as having a binary character. That is the parameter has two states—one which enables some printer characteristic and the other which disables the same printer characteristic. When combined with other information obtained by testing other parameters, the specific function that is controlled may be established.

Figure 5:
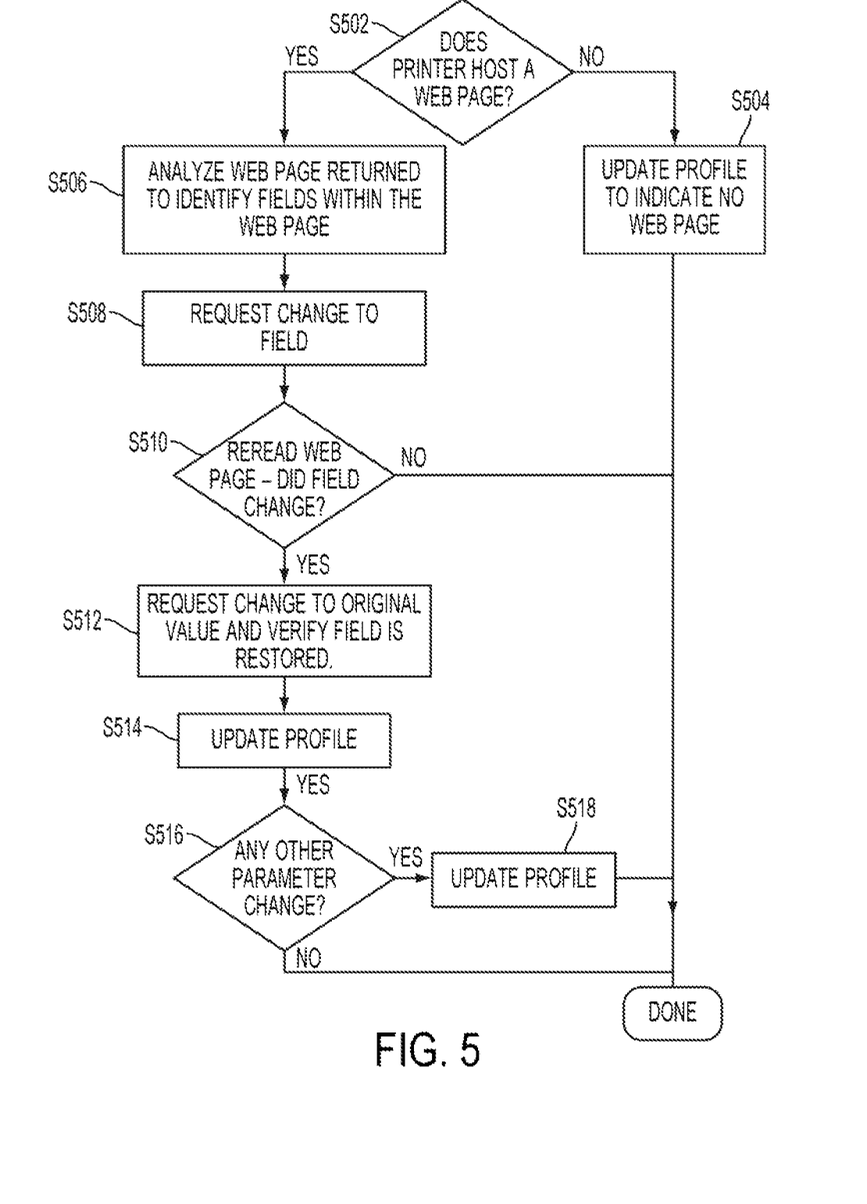
FIG. 5 shows an alternative way to request a state change.

FIG. 5 shows an alternative way to request a state change. Conventional networked printers may host a web page that includes information about the state of the printer and further allows changes to be made to some of the printer's parameters via the web page. If a probe indicates that the printer does host a web page, a variety of HTTP protocol requests may be made to determine the identity of a printer's parameters presented on the printer web page.

In step S502, a probe is made to determine if the printer hosts a web page. This probe may be in the form of an HTTP request. If a positive response is returned, control continues at step S506. If a negative response, or no response, is returned, the printer profile is updated in step S504 to indicate that the printer does not respond to HTTP requests.

In step S506, the web page returned by the request in step S502 is analyzed to identify fields within the web page that identify parameters that the web page displays. In other words, all the data returned by HTTP is analyzed at to identify changes from the previous baseline.

In step S508, one of the fields is selected and a request is sent to change the field. For example, if the field contains text, the request may be to change the text to some random text. If the field contains a numerical value, the choice may be to increment it by some randomly chosen number. Before the change is requested, the original value of the field is saved.

After the request in step S508, the web page is read again and the field being tested is examined, in step S510, to see if the value has changed. If the field did not change, this process is completed. The process may be iterated for each field that is identified on the web page.

If the field did change in step S512, the original value of the field is used as part of a request to change the field value. After the request, the web page is re-read to verify that the field is restored and the profile is updated in step S514.

During the update process, any data attached to the field in the HTML code for the web page may be used to further establish the identity of the field.

In step S516, the state of the printer's other parameters; not part of the web page, e.g. information in the printer management information base; is examined to determine if a parameter has changed in a way that is connected with the change of the web page parameter.

For example, the change request may have been to replace a string value field with a nonsense string. If the change is connected, in state B the nonsense string should appear as the value of the changed parameter. If so, in step S518, the added information is used to further update the profile.

Figure 6:
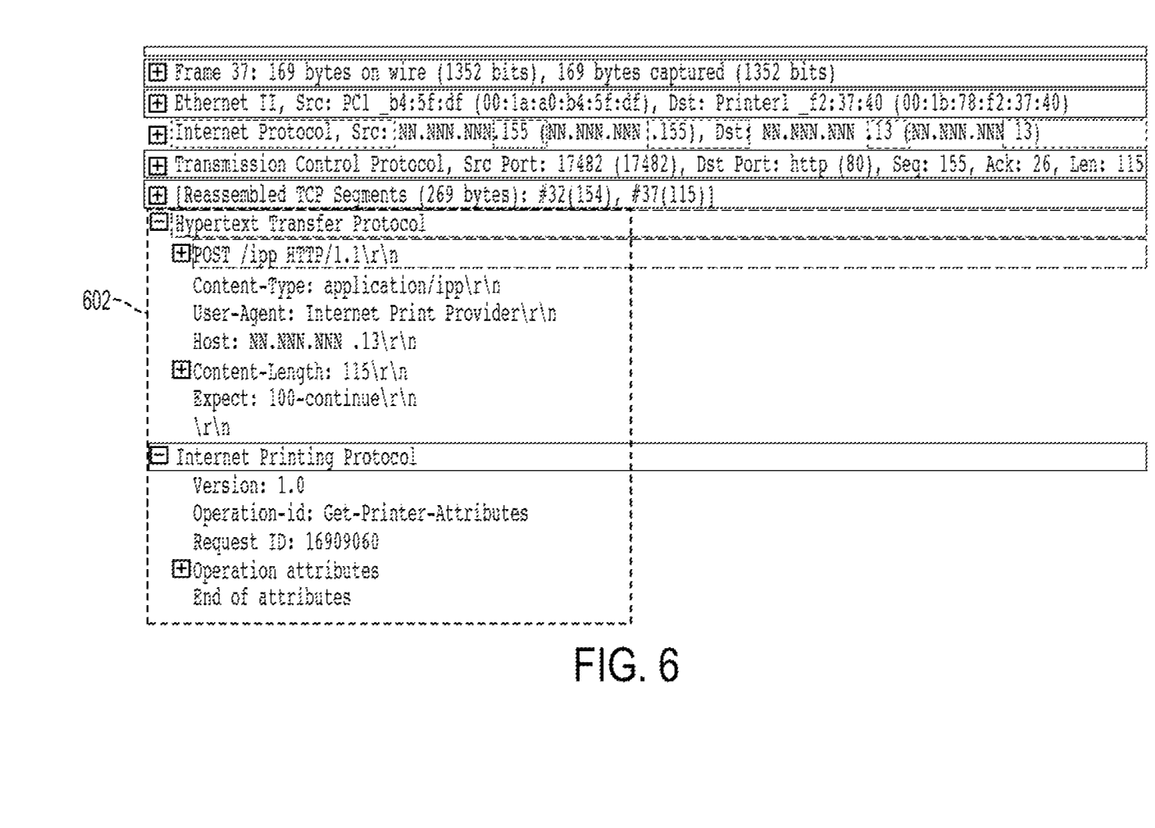
FIG. 6 shows the details of the Ethernet packet for an HTTP request from a control computer and a printer.

FIG. 6 shows the details of the Ethernet packet for an HTTP request from a control computer and a printer. Expanded lines 602 show that the packet is an HTTP POST request. Furthermore, the request is directed to an Internet Print Provider with an IP address of NN.NNN.NNN.13 and is specifically a Get-Printer-Attributes request.

Figure 7:
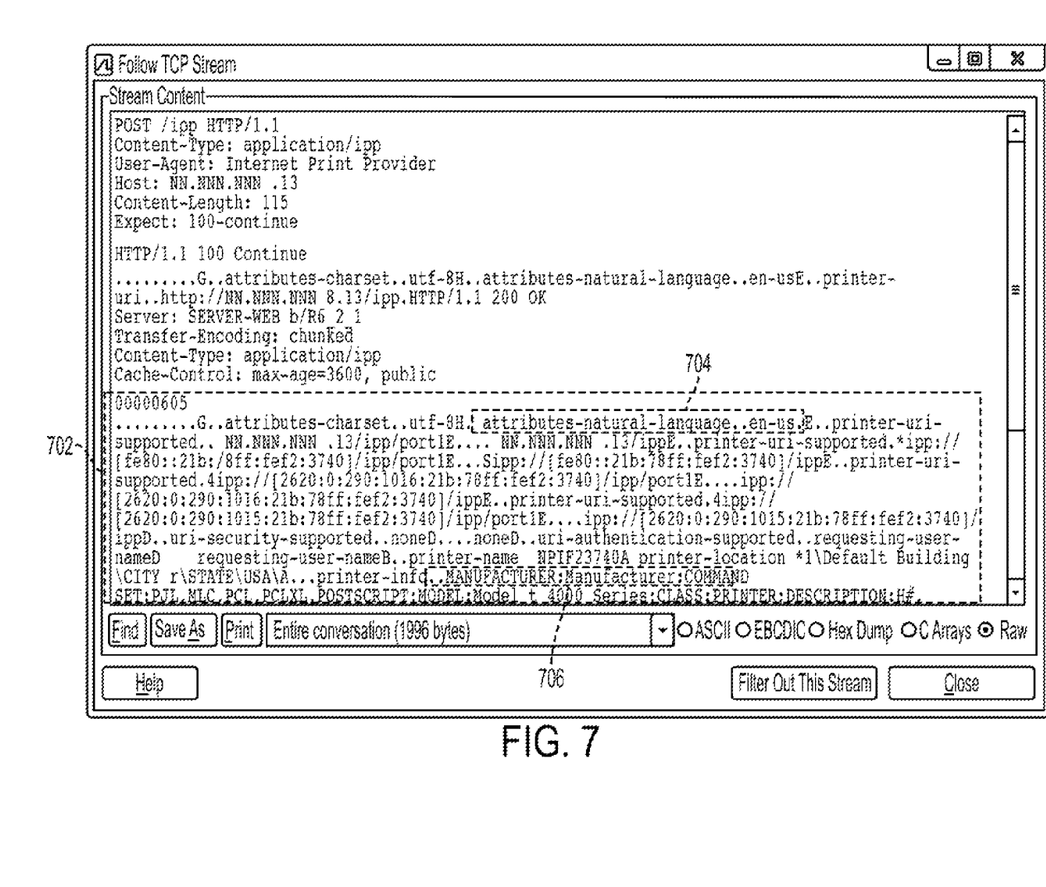
FIG. 7 shows a computer screen display of the information contained in the response to the request of FIG. 6.

FIG. 7 shows a computer screen display of the information contained in the response to the request of FIG. 6. Lines 702 show in human-readable form a set of attributes and values. For example, the string indicated by 704 shows that the printer has the attribute "attribute-natural-language" with a value of "en-US" which means that the printer displays its attributes in US English. The attribute list includes information that may be used to either establish the profile directly such as in element 704. The attribute list also contains information that may be used with other, separate information, to help establish profile values.

An example is element 706 which shows that the printer is manufactured by Manufacturer. This particular information may be used to compare the attributes of the printer under test to the corresponding information that is known about other printers manufactured by Manufacturer.

The development of the profile may be aided by having a remote server that stores profiles from several establishments running the process of FIG. 1.

The administrative processor, running the process, may communicate with the server to store any updated profiles, even if not complete, on the server. The server may compare the uploaded profiles to profiles uploaded by other administrative processors and consolidate the results to develop a more complete profile. As part of the communication process, the server may also download any updated profiles to each local administrative processor. In this fashion, the development of profiles may be accelerated.

Figure 8:
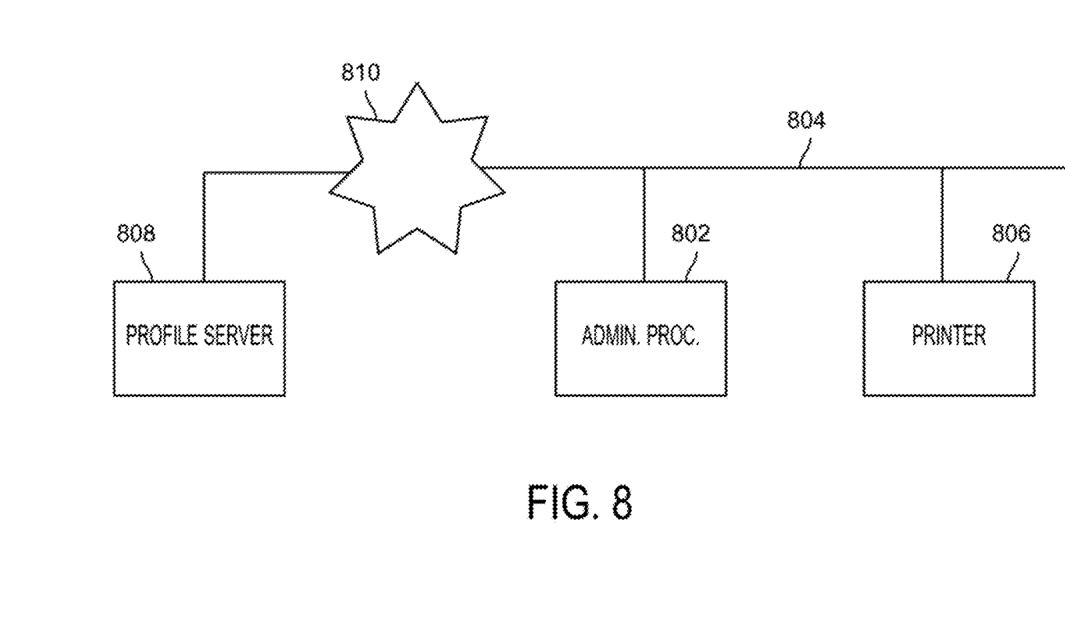
FIG. 8 shows a block diagram of a system to automatically determine the identities of a set of initially unknown parameters of a printer

FIG. 8 shows a block diagram of a system to build a profile of an unknown printer on a network. The system includes an administrative processor 802 connected to a network 804. There is a printer 806, also connected to the network 810, whose characteristics are unknown.

The administrative processor 802 queries the unknown printer 806 via one of a plurality of standard protocols. For example, the administrative processor 802 may use the Simple Network Management Protocol. Alternatively, the administrative processor 802 may use the HTTP protocol.

Other communication profiles are well known in the art. Using one of the available communication protocols, the administrative processor 802 follows the process described in FIG. 1 above. Furthermore, the administrative processor 802 may follow the expanded process as described in FIG. 2.

FIG. 8 also shows a separate server 808 in communication with the administrative processor 802 via an internet 810. The administrative processor 802 may communicate with the server 808 to store completed or partially completed profiles for any printers that the administrative processor 802 has compiled.

Furthermore, the server 808 may communicate to the administrative processor 802 any profiles that the server may have received from other administrative processors, possible in locations or environments not associated with the administrative processor 802.

By sharing the profile data via the server 808, every administrative processor in communication with the server 808 benefits from the work performed elsewhere. Even if two of the administrative processors are from different organizations, only profile data is shared so there is no loss of proprietary data.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automatically detecting parameters of a printer on a network having an unknown profile, to create a useable profile for the printer on the network having the unknown profile, comprising:

(a) querying, via a predetermined protocol between a network administrator processor and the printer on the network having the unknown profile, a first state of the printer on the network having the unknown profile, a state of the printer on the network having the unknown profile being defined by values associated with a plurality of parameters of the printer on the network having the unknown profile, the first state being defined as a first set of values associated with the plurality of parameters of the printer on the network having the unknown profile;

(b) communicating, via a communication protocol, a first set of instructions to the printer on the network having the unknown profile to change the state of the printer on the network having the unknown profile from a first state to a second state by causing a value associated with the plurality of parameters to change;

(c) querying, via the predetermined protocol, the second state of the printer on the network having the unknown profile, the second state being defined as a second set of values associated with the plurality of parameters;

(d) querying, after a delay, via the predetermined protocol, a third state of the printer on the network having the unknown profile, the third state being defined as a third set of values associated with the plurality of parameters;

(e) identifying, using a processor, a parameter associated with the state of the printer on the network having the unknown profile by comparing the first state of the printer on the network having the unknown profile to the second state of the printer on the network having the unknown profile and the third state of the printer on the network having the unknown profile; and (f) creating, using the processor, a useable profile for the printer on the network having the unknown profile based upon the identified parameters.

2. The method of claim 1, wherein the parameters associated with the state of the printer on the network having the unknown profile are identified by comparing parameters that change between the first and second state and change between the second state and the third state.

3. The method of claim 1, wherein the parameters associated with the state of the printer on the network having the unknown profile are identified by comparing parameters that change between the first and second state but do not change between the second state and the third state.

4. The method of claim 1, further comprising:

(g) communicating, via the communication protocol, a second set of instructions to the printer on the network having the unknown profile to change the state of the printer on the network having the unknown profile, the state change associated with the second set of instructions being an opposite state of caused by the first set of instructions;

(h) querying, via the predetermined protocol, the state of the printer on the network having the unknown profile, the state being defined as a fourth set of values associated with the plurality of parameters;

(i) identifying parameters that change between an enable-like state and a disable-like state in response to the first set of instructions and that change between a disable-like state to an enable-like state in response to the second set of instructions.

5. The method of claim 1, wherein the state change comprises changing a string value of a parameter and the parameter that matches the requested string value change is identified.

6. The method of claim 1, further comprising sending an identified printer parameter set to a central database server.

7. The method of claim 1, further comprising:

using information from other printers on the network of a same manufacturer to further identify printer parameters of the printer on the network having the profile, manufacturer identification being identified from the first state.

8. The method of claim 1 where the query protocol is SNMP.

9. The method of claim 1 where the query protocol is HTTP.

10. A system for automatically detecting parameters of a printer on a network having an unknown profile, to create a useable profile for the printer on the network having the unknown profile, comprising:

a networked printer having an unknown profile;

a network administrator processor for querying, via a predetermined protocol between the networked printer having the unknown profile, a first state of the networked printer having the unknown profile, a state of the networked printer having the unknown profile being defined by values associated with a plurality of parameters of the networked printer having the unknown profile, the first state being defined as a first set of values associated with the plurality of parameters of the networked printer having the unknown profile;

said network administrator processor communicating, via a communication protocol, a first set of instructions to the network printer having the unknown profile to change the state of the networked printer having the unknown profile from a first state to a second state by causing a value associated with the plurality of parameters to change;

said network administrator processor querying, via the predetermined protocol, the second state of the networked printer having the unknown profile, the second state being defined as a second set of values associated with the plurality of parameters;

said network administrator processor querying, after a delay, via the predetermined protocol, a third state of the networked printer having the unknown profile, the third state being defined as a third set of values associated with the plurality of parameters;

said network administrator processor identifying a parameter associated with the state of the networked printer having the unknown profile by comparing the first state of the networked printer having the unknown profile to the second state of the networked printer having the unknown profile and the third state of the networked printer having the unknown profile;

said network administrator processor creating a useable profile for the networked printer having the unknown profile based upon the identified parameters.

11. The system of claim 10, wherein the parameters associated with the state of the networked printer having the unknown profile are identified by comparing parameters that change between the first and second state and change between the second state and the third state.

12. The system of claim 10, wherein the parameters associated with the state of the networked printer having the unknown profile are identified by comparing parameters that change between the first and second state but do not change between the second state and the third state.

13. The system of claim 10, wherein said network administrator processor communicates, via the communication protocol, a second set of instructions to the networked printer having the unknown profile to change the state of the networked printer having the unknown profile, the state change associated with the second set of instructions being an opposite state of caused by the first set of instructions;

said network administrator processor querying, via the predetermined protocol, the state of the networked printer having the unknown profile, the state being defined as a fourth set of values associated with the plurality of parameters;

said network administrator processor identifying parameters that change between an enable-like state and a disable-like state in response to the first set of instructions and that change between a disable-like state to an enable-like state in response to the second set of instructions.

14. The system of claim 10, wherein the state change comprises changing a string value of a parameter and the parameter that matches the requested string value change is identified.

15. The system of claim 10, wherein said network administrator processor sends an identified printer parameter set to a central database server.

16. The system of claim 10, wherein said network administrator processor uses information from other printers on the network of a same manufacturer to further identify printer parameters of the networked printer having the unknown profile, manufacturer identification being identified from the first state.

* * * * *